J. D. CHANTLER.

PLANTER.

APPLICATION FILED JULY 31, 1916.

Reissued Jan. 2, 1917.

14,238.

2 SHEETS—SHEET 1.

Irving Katz

Mary M. Lipp

James D. Chantler

INVENTOR

BY

Robert B. Lillgock

ATTORNEY

THE NORRIS PETERS CO., PHOTO-LITHO., WASHINGTON, D. C.

J. D. CHANTLER.

PLANTER.

APPLICATION FILED JULY 31, 1916.

Reissued Jan. 2, 1917.

14,238.

2 SHEETS—SHEET 2.

Irving Katz

Mary M. Lipp

James D. Chantler

INVENTOR

BY

Robert B. Gillespie

ATTORNEY

THE NORRIS PETERS CO., PHOTO-LITHO., WASHINGTON, D. C.

UNITED STATES PATENT OFFICE.

JAMES D. CHANTLER, OF FREEPORT, NEW YORK.

PLANTER.

14,238. Specification of Reissued Letters Patent. Reissued Jan. 2, 1917.

Original No. 1,142,400, dated June 8, 1915, Serial No. 879,680, filed December 30, 1914. Application for reissue filed July 31, 1916. Serial No. 112,436.

*To all whom it may concern:*

Be it known that I, JAMES D. CHANTLER, a citizen of the United States, residing at Freeport, in the county of Nassau and State of New York, have invented certain new and useful Improvements in Planters, of which the following is a specification.

My invention relates to improvements in planters, intended primarily for putting seed potatoes into the ground and my objects are the production of a machine in which the seed potatoes cannot clog, which will reliably and uniformly deliver them to the furrow at fixed intervals and in which the feed will be visible so the operator is at all times sure that the delivery of the seed potatoes is being properly carried out.

Figure 1:
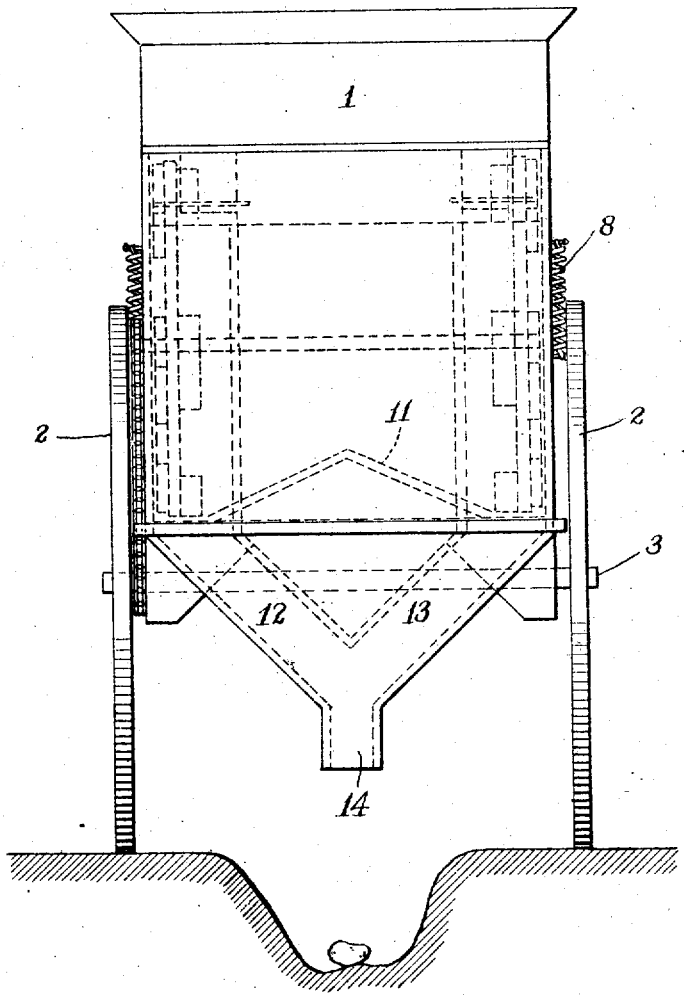
Figure 2:
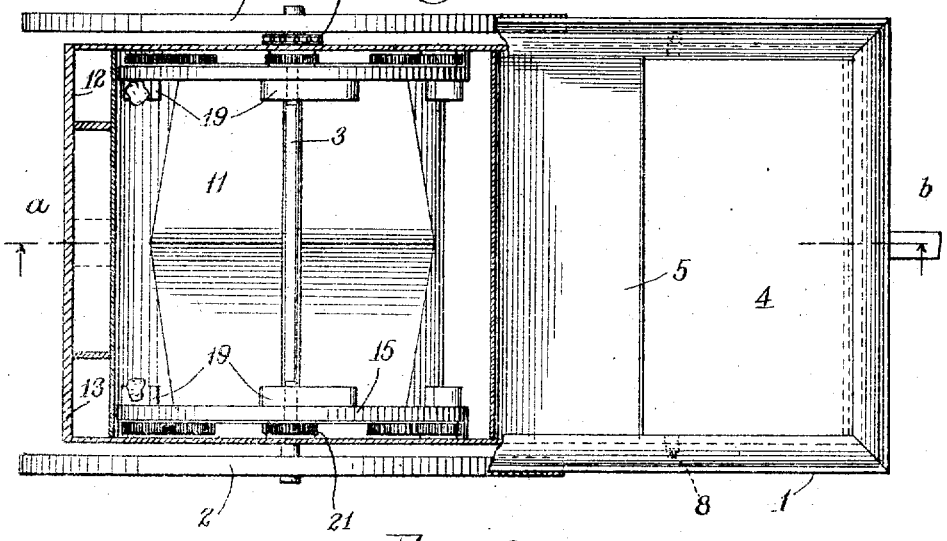
Figure 3:
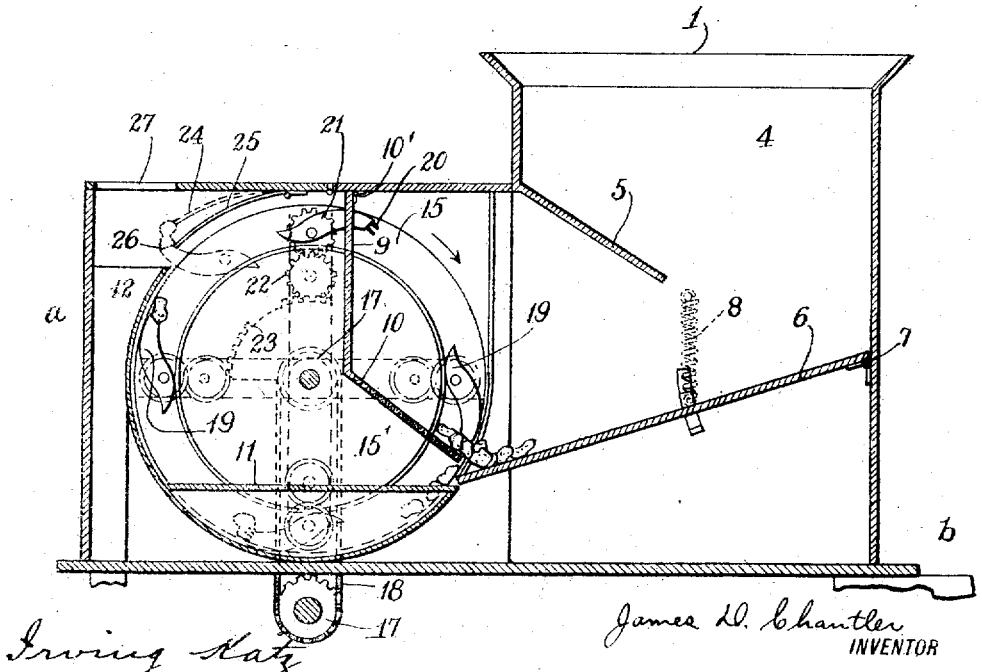

In the drawings, Figure 1 is a rear view of the planter; Fig. 2, a top view and Fig. 3, a side sectional view.

The planter comprises a body 1 mounted on the wheels 2—2 carried on the axle 3. The body has a hopper 4 with a deflector 5 and a bottom 6, extending to the edge of the chamber. The bottom is hinged at 7 and supported by springs 8—8 so that when in motion a vibratory motion will be imparted preventing any clogging. To regulate the flow or feeding of the seed potatoes into the chamber, when the chamber has enough, a second deflector having a solid wall hinged at 10′, and a yieldable section 10, preferably canvas in a frame, is so mounted that the lower edge of the yieldable portion 10 approaches the bottom 6 leaving an opening between them through which the potatoes pass to the transferring mechanism, the seed holding deflector thus preventing clogging. This transferring mechanism comprises a pair of wheels with delivery fingers thereon arranged on opposite sides of the planter with an A-shaped bottom 11 between them which causes the seed potatoes to be in the path of the fingers. Delivery chutes 12 and 13 lead to a common outlet 14 from whence the seed potatoes fall into the furrow and are covered over.

The transferring mechanism and its method of operation will now be described, it being understood that one or more of these devices may be mounted in a planter. A wheel 15 is rotated by a sprocket 17 and a chain 18. This wheel has pivotally mounted near its periphery, a plurality of fingers 19—19 carrying prongs 20 on the front ends. Each finger has a gear 21 secured thereto, meshing with a gear 22 also, mounted on the wheel 15. Normally these fingers are in the position shown in full lines in Fig. 3, and on rotation the prongs 20 will pick up a seed potato as they pass through the mass in the bottom of the machine carrying it to the top. A stationary disk 15′ acts as a drag upon the seed when the wheel 15 is revolving keeping the seed in about the middle of the chamber. A segment gear 23 is mounted on the body and as gear 22 engages it the finger 19 is turned over as shown in dotted lines at 24 in Fig. 3 bringing the seed potato over the outlet chute 12. A hinged trap 25 is pushed back until the potato is between it and a wiper 26 so that the continued rotation of wheel 15 will retract the finger 19 pulling the prongs 20 out of the seed potato and permitting it to fall into the chute 12 and outlet 14 into the furrow. The continued movement of the wheel 15 causes the finger 19 to complete its turn over and when the gear 23 is cleared the finger is in position to pick up another potato when it reaches the bottom of the planter.

As two wheels and sets of fingers are used a slow speed can be maintained thus increasing the reliability of the planter. The operator who is located at *a*, the draft being from *b*, can at all times observe that the ground is receiving the seed potatoes through the opening 27 and the danger of leaving unseeded furrows is obviated.

I claim:—

1. A planter comprising a hopper, a wheel adjacent to said hopper, fingers on said wheel, prongs on the fingers adapted to engage the seed, a stationary disk filling said wheel, means for revolving the wheel, means for rotating the fingers at a predetermined point and means for removing the seed from the fingers.

2. A planter comprising a hopper, a yieldable bottom therein, a partition having a yieldable section adjacent to the bottom, a chamber having an A-shaped bottom, rotating members located to rotate in the bottom of the chamber, fingers on said rotating members adapted to engage the seed, means for rotating said members, means for rotating said fingers at a predetermined point, a swinging flap adapted to engage the seed to remove it from the fingers and a chute located adjacent thereto to receive the seed and deliver it to the furrow.

3. In a potato planter a seed chamber, a rotating member therein, means for rotating said member, pronged fingers rotatively mounted on said member adapted to engage the seed and means for rotating the fingers at a predetermined point.

4. A potato planter comprising a seed chamber, a wheel therein, pronged fingers on said wheel adapted to engage the seed, a filler in said wheel, means for rotating the fingers at a predetermined point and means for removing the seed from the fingers.

5. In a potato planter a hopper adapted to hold the main mass of seed, a bottom therein, a partition, a seed chamber adjacent to the hopper adapted to hold a smaller mass of seed, members located to rotate in the bottom of the chamber, means for removing the seed at a predetermined point and a chute adjacent to the point of removal adapted to receive the seed and deliver it to the furrow.

6. In a potato planter a seed chamber having an A-shaped bottom, rotating members located to rotate in the bottom of said chamber, pronged fingers rotatively mounted on said members adapted to engage the seed, means for rotating the fingers at a predetermined point, means for removing the seed at a predetermined point and a chute located adjacent thereto adapted to receive the seed and deliver it to the furrow.

7. In a potato planter a seed chamber, a rotating member therein, means for rotating the member, pronged fingers on said member adapted to engage the seed, means for rotating the fingers on the member at a predetermined point and means for thereafter removing the seed from the fingers.

In testimony whereof I have hereunto subscribed my name in the presence of two attesting witnesses.

JAMES D. CHANTLER.

Witnesses:
ARTHUR WHITEHOUSE,
C. MILLER.

Copies of this patent may be obtained for five cents each, by addressing the "Commissioner of Patents. Washington, D. C."